United States Patent
Nair et al.

(10) Patent No.: US 9,769,713 B2
(45) Date of Patent: Sep. 19, 2017

(54) METHOD OF RELOCATING ACCESS SERVICE NETWORK FUNCTIONAL ENTITIES DURING MOBILITY EVENTS IN WIMAX NETWORKS

(75) Inventors: Suresh P. Nair, Whippany, NJ (US); Peretz Feder, Englewood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/048,725

(22) Filed: Mar. 15, 2011

(65) Prior Publication Data

US 2011/0238834 A1 Sep. 29, 2011

Related U.S. Application Data

(60) Provisional application No. 61/317,519, filed on Mar. 25, 2010.

(51) Int. Cl.
| | |
|---|---|
| G06F 15/173 | (2006.01) |
| H04W 36/00 | (2009.01) |
| H04W 48/20 | (2009.01) |
| H04W 92/22 | (2009.01) |
| H04L 29/06 | (2006.01) |
| H04W 12/06 | (2009.01) |

(52) U.S. Cl.
CPC ..... H04W 36/0033 (2013.01); H04L 63/0892 (2013.01); H04W 12/06 (2013.01); H04W 36/0038 (2013.01); H04W 48/20 (2013.01); H04W 92/22 (2013.01)

(58) Field of Classification Search
CPC ............. H04W 36/00; H04W 36/0005; H04W 36/0016; H04W 36/0033
USPC ........................................ 709/223, 225–226
See application file for complete search history.

(56) References Cited

U.S. PATENT DOCUMENTS 8,543,131 B2 * 9/2013 Premec ...................... 455/456.1
2007/0105567 A1 * 5/2007 Mohanty ............... H04W 68/02
455/458

(Continued)

FOREIGN PATENT DOCUMENTS

| CN | 101656944 A | 2/2010 |
|---|---|---|
| EP | 2315474 | 4/2011 |
| WO | WO 2010083443 A1 | 7/2010 |

OTHER PUBLICATIONS

International (PCT/US2011/029735 Search Report dated Mar. 24, 2011 and Written Opinion.
Max Riegel, Aik Chindapol, Dirk Kroeselberg: "Deploying Mobile WiMAX" Nov. 30, 2009, John Wiley & Sons Ltd., XP-002637564, ISBN: 9780470694763, pp. 278-281; Section 8.2.

(Continued)

*Primary Examiner* — Jason Recek
(74) *Attorney, Agent, or Firm* — Davidson Sheehan LLP

(57) ABSTRACT

The present invention provides a method of relocating functional entities in access service networks during mobility events. One embodiment of the method includes providing context information representative of two or more functional entities from a source access service network (ASN) to a target ASN. Another embodiment of the method includes receiving context information representative of two or more functional entities at a target ASN from a source ASN. The context information for the functional entities is associated with an access terminal and is provided in response to the source ASN receiving a relocation notification from the target ASN as a result of a handoff request or a location update message.

12 Claims, 7 Drawing Sheets

(56) References Cited

U.S. PATENT DOCUMENTS

| | | | | |
|---|---|---|---|---|
| 2007/0105600 | A1* | 5/2007 | Mohanty | H04W 68/00 455/574 |
| 2007/0218926 | A1* | 9/2007 | Zhuang | H04W 60/04 455/466 |
| 2008/0214213 | A1* | 9/2008 | Etemad | H04W 12/02 455/456.6 |
| 2008/0259889 | A1* | 10/2008 | Wu | 370/338 |
| 2009/0213810 | A1* | 8/2009 | Shousterman et al. | 370/331 |
| 2009/0279502 | A1* | 11/2009 | Zheng | H04W 36/0033 370/331 |
| 2009/0290556 | A1* | 11/2009 | Taaghol | H04W 36/0066 370/331 |
| 2010/0107235 | A1* | 4/2010 | Premec | 726/12 |
| 2010/0232407 | A1* | 9/2010 | Navali et al. | 370/338 |
| 2010/0234025 | A1* | 9/2010 | Julka | 455/436 |
| 2011/0076987 | A1 | 3/2011 | Lee et al. | |
| 2011/0213822 | A1* | 9/2011 | Yavilevich | 709/202 |
| 2011/0216735 | A1* | 9/2011 | Venkatachalam et al. | 370/331 |
| 2011/0281581 | A1* | 11/2011 | Brandt et al. | 455/427 |
| 2012/0190371 | A1* | 7/2012 | Wu | 455/437 |
| 2013/0094473 | A1* | 4/2013 | Wang | 370/331 |

OTHER PUBLICATIONS

Wimax Forum: "WiMAX Forum Network Architecture Detailed Protocols and Procedures Base Specification WMF-T33-001-R016v01", Nov. 30, 2010, XP-002636568; Retrieved from the Internet: http://www.wimaxforum.org/sites/wimaxforum.org/files/technical_document/2010/12/WMF-T33-001-R016v01_Network-Stage3-Base.pdf [retrieved on May 12, 2011] pp. 663-691.

Etemad et al, "WiMAX Technology and Network Evolution", Feb. 11, 2011, John Wiley & Sons, Inc., Hoboken, NJ, USA, XP002636951, ISBN: 9780470633021, p. 174, Section 6.6.2.

Release 1.6: Optimized Combined and Standalone Relocation (OCR) Amendment; WiMAX Forum Network Working Group; Amendment-Optimized Combined Relocation—R016v01-A_T33-001; Jan. 8, 2010; Copyright 2007-2010.

Nair, Suresh "Active Mode Combined AA+FA Relocation (without Re-authentication)"; Mar. 2010.

WiMAX Forum Network Architecture, Detailed Protocols and Procedures, Base Specification, WMF-T33-001-R016v01; Nov. 30, 2010 1165 pages http://www.wimaxforum.org/sites/wimaxforum.org/files/technical_document/2010/12/WMF-T33-001-R016v01_Network-Stage3-Base.pdf.

* cited by examiner

METHOD OF RELOCATING ACCESS SERVICE NETWORK FUNCTIONAL ENTITIES DURING MOBILITY EVENTS IN WIMAX NETWORKS

CROSS REFERENCE TO RELATED APPLICATIONS

This application claims priority to U.S. Provisional Patent Application 61/317,519 filed on Mar. 25, 2010.

BACKGROUND OF THE INVENTION

1. Field of the Invention

This invention relates generally to communication systems, and, more particularly, to mobility procedures in communication systems.

2. Description of the Related Art

Conventional communication systems use a network of access nodes to provide network connectivity to one or more access terminals using wired and/or wireless connections. Network architectures generally fall into two broad categories: hierarchical and distributed. Hierarchical network architectures used centralized entities to handle mobility management and radio resource control. For example, in conventional hierarchical communications, a server transmits voice and/or data signaling destined for a target access terminal to a central element such as such as a Radio Network Controller (RNC). The RNC may then transmit paging messages to the target access terminal via one or more access nodes to locate the target access terminal. The target access terminal may establish a communication link to one or more of the access nodes in response to receiving the page from the network. A radio resource management function within the RNC receives the voice and/or data signaling and coordinates the radio and time resources used by the set of access nodes to transmit the information to the target access terminal. The radio resource management function can perform fine grain control to allocate and release resources for broadcast transmission over a set of access nodes.

In contrast, a distributed network includes access points that implement distributed communication network functionality. For example, each distributed access point may combine part or all of the RNC and/or Packet Data Serving Node (PDSN) functions in a single entity that manages radio links between one or more access terminals and an outside network, such as the Internet. Distributed access points may implement proxy functionality that utilizes core network element support to equivalent IP functions. For example, IP anchoring in a UMTS base station router may be offered through a Mobile IP Home Agent (HA) and the Gateway GPRS Support Node (GGSN) anchoring functions that the base station router proxies through equivalent Mobile IP signaling. Compared to hierarchical networks, distributed architectures have the potential to reduce the cost and/or complexity of deploying the network, as well as the cost and/or complexity of adding additional access points to expand the coverage of an existing network. Distributed networks may also reduce (relative to hierarchical networks) the delays experienced by users because packet queuing delays at the RNC and PDSN of hierarchical networks may be reduced or removed.

At least in part because of these advantages, many proposed standards and/or protocols for the WiMAX communication system assume that the WiMAX system can implement a distributed architecture of access nodes. Consequently, many of the mobility related procedures set forth in the proposed standards are designed to support and/or enhance distributed functionality. For example, access service networks in a WiMAX network implement functional entities such as a paging controller, an anchor authenticator, and an anchor data path function to support communication links with each access terminal. The functional entities are independently migrated between access service networks belonging to the same operator as the access terminal moves through the WiMAX network. However, the optimal criteria and/or conditions for migration of the different entities may be different for each entity. The proposed standards take advantage of the flexibility of the distributed network to accommodate these differences by specifying a different procedure for migration of each entity between access service networks belonging to the same operator. The multiple independent migration procedures may, however, represent significant additional overhead, particularly in hierarchical systems.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for relocating functional entities in access service networks during mobility events. One embodiment of the method includes providing context information representative of two or more functional entities from a source access service network (ASN) to a target ASN. Another embodiment of the method includes receiving context information representative of two or more functional entities at a target ASN from a source ASN. The context information for the functional entities is associated with an access terminal and is provided in response to the source ASN receiving a relocation notification or a handoff request from the target ASN as a result of a handoff request or a location update message.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
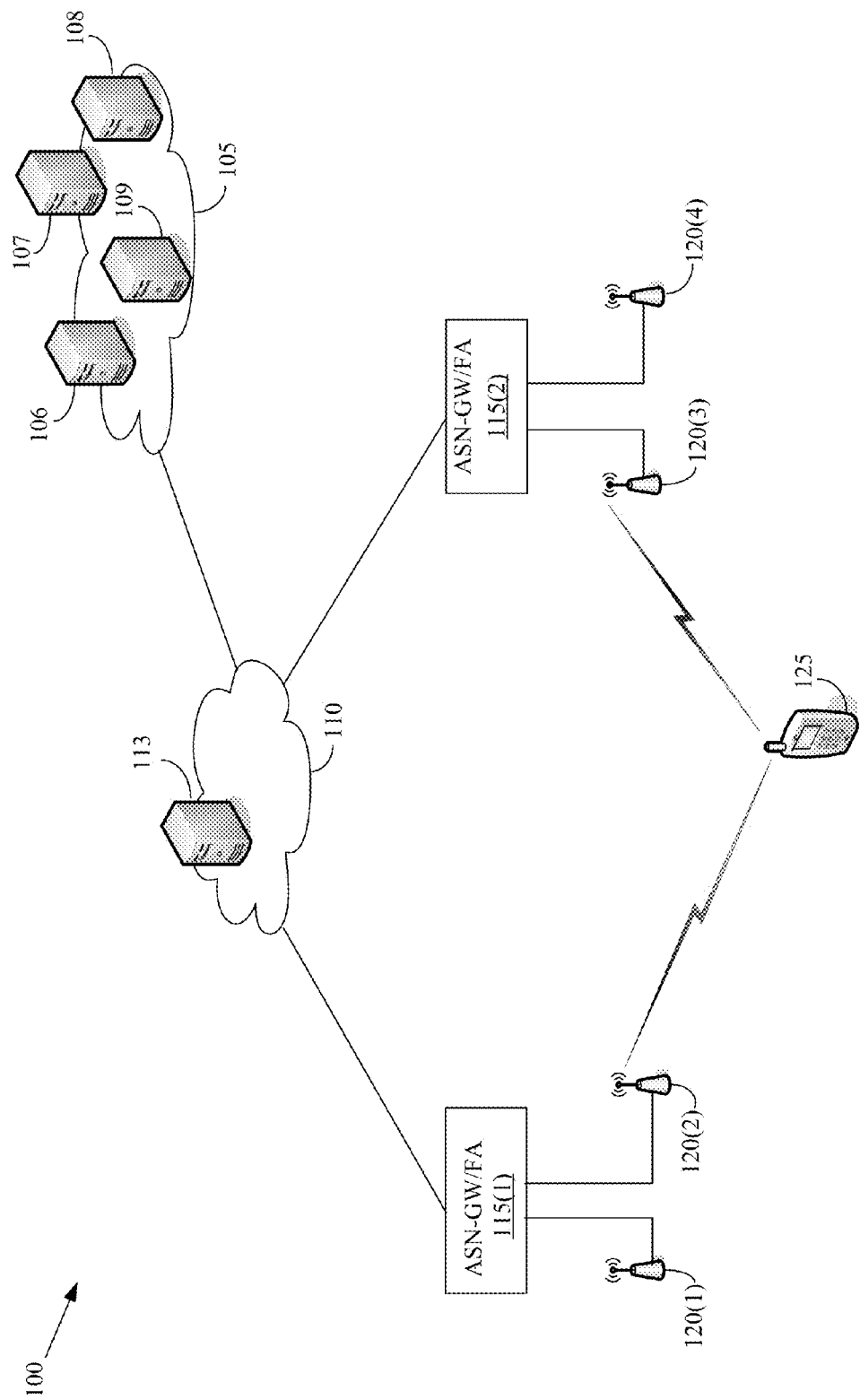
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of combined relocation processes that can be used to relocate multiple functional entities between access service network gateways (ASN-GWs). Combinations of a paging controller, an anchor authenticator, and an anchor data path function can be relocated between ASN-GWs in a WiMAX system using an optimized message flow that significantly reduces the number of messages needed to relocate these functional entities. For example, an idle mobile unit may send a Location Update to a new BS and ASN-GW when the idle mobile unit moves from an old Paging Group to a new Paging Group that includes the new BS and ASN-GW. The new ASN-GW receives the Location Update Request and may send a request to the old serving ASN-GW for a combined relocation of the mobile unit's Anchor Authenticator and Paging Controller context information to the new ASN-GW. The old ASN-GW may check the validity of Location Update request and, if the Location Update is valid and if the old ASN-GW supports the combined relocation procedure, the old ASN-GW responds positively with the context information. The old ASN-GW may record the location of the mobile device indicated in a location update if relocation of functional entities is denied for any reason.

FIG. 1 conceptually illustrates a first exemplary embodiment of a wireless communication system 100. In the illustrated embodiment, the wireless communication system 100 includes a home core serving network 105 that includes an IP mobility subsystem server 106, a billing server 107, a home authentication, authorization, and accounting (AAA) server 108, and a home agent 109 that may serve as a common IP mobility anchor point for devices within the system 100. The wireless communication system 100 also includes a visited core network 110 that may include a visited AAA server 113. Techniques for implementing and operating the elements of the networks 105, 110 are known in the art and in the interest of clarity only those aspects of implementing and/or operating the elements of the networks 105, 110 that are relevant to the claimed subject matter will be discussed herein. Furthermore, persons of ordinary skill in the art having benefit of the present disclosure should appreciate that the wireless communication system 100 may include other elements that are not shown in FIG. 1 in the interest of clarity.

The wireless communication system 100 implements WiMAX standards and/or protocols. The WiMAX system 100 includes access serving networks (ASN) 115 that control access to the network 110 for devices that are in communication with access nodes 120. The ASN 115 may also function as a WiMAX gateway and/or foreign agent. The ASN 115 typically supports functional entities such as paging controllers, anchor authenticators, foreign agent, anchor data path functions, and the like for access terminals 125 that are in communication with the ASN 115. In the WiMAX architecture, the foreign agent and the anchor data path function are typically co-located in ASN 115. Exemplary access terminals 125 may include, but are not limited to, subscriber terminals, customer premise equipment (CPE), fixed wireless terminals, mobile wireless terminals, mobile units, and/or other fixed or mobile wireless devices. Although the wireless communication system 100 depicted in FIG. 1 includes elements that operate according to WiMAX, persons of ordinary skill in the art having benefit of the present disclosure should appreciate that other portions of the wireless communication system 100 may operate according to different standards and/or protocols. For example, the wireless communication system 100 may be a portion of a heterogeneous network that implements WiMAX, WiFi, EV-DO, and the like. Standards and protocols for implementing and operating EV-DO, WiMAX, and WiFi networks are known in the art and in the interest of clarity only those aspects to implementing and operating these networks that are relevant to the claimed subject matter will be discussed herein.

Functional entities within the ASN 115 may be migrated in response to mobility events, e.g., when the access terminal 125 moves or is handed off between the ASN 115. In the illustrated embodiment, the ASNs 115 are configured to support combined relocation of multiple functional entities in a single consolidated message flow. For example, the source ASN 115(1) may transfer the functional entities by providing context information representative of two or more of the functional entities to the target ASN 115(2) when the access terminal 125 hands off from the ASN 115(1) to the ASN 115(2). The target ASN 115(2) receives the context information and uses it to configure or instantiate the functional entities for the access terminal 125. The context information for the functional entities may be provided in response to the source ASN 115(1) receiving a relocation notification or a handoff request from the target ASN 115(2).

Figure 2:
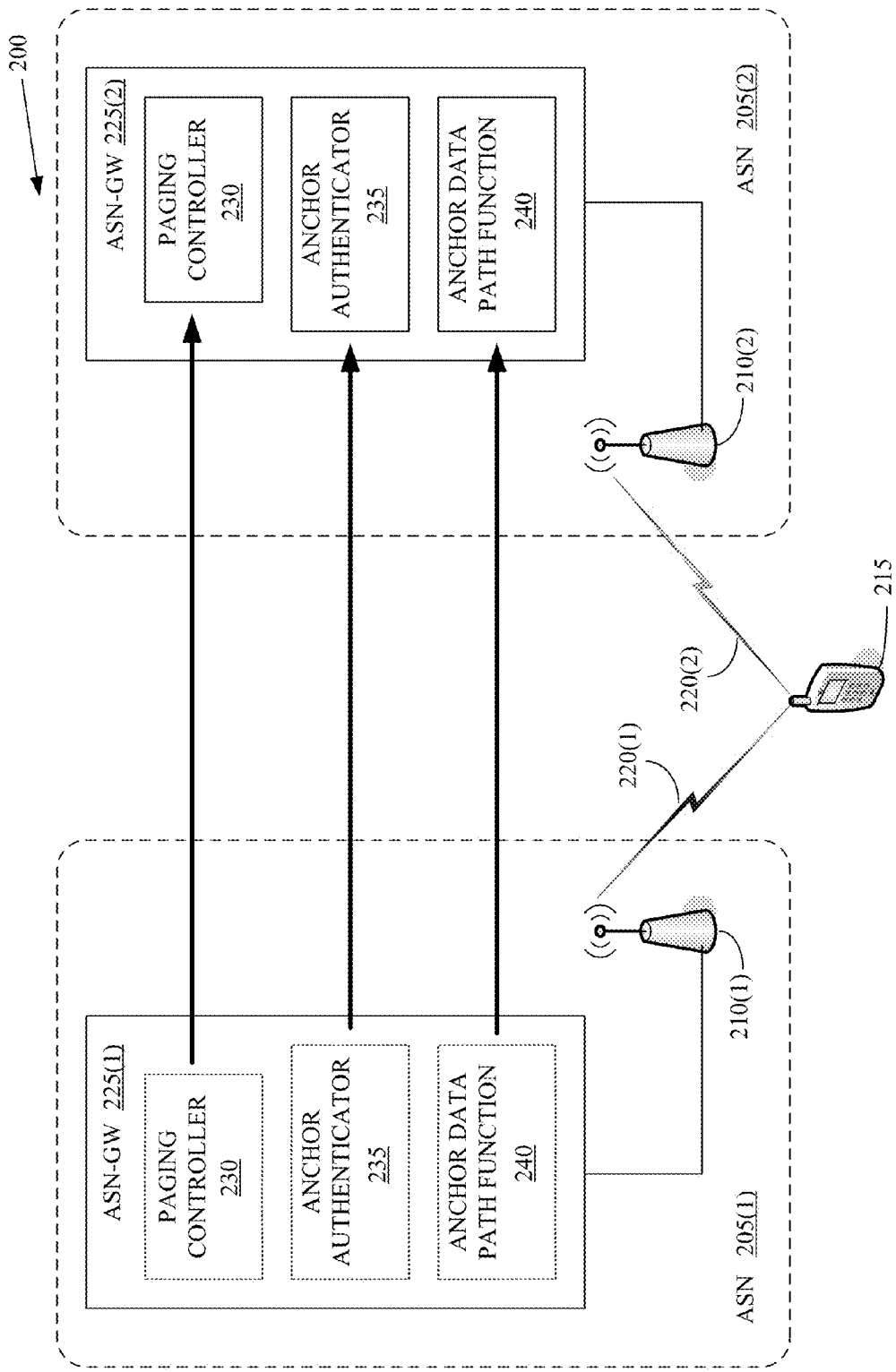
FIG. 2 conceptually illustrates a second exemplary embodiment of a wireless communication system.

FIG. 2 conceptually illustrates a second exemplary embodiment of a wireless communication system 200. In the illustrated embodiment, the wireless communication system 200 includes access serving networks 205 that include base stations 210 for providing wireless connectivity to a access terminal 215 over air interfaces 220. The access serving networks 205 also include gateways (ASN-GW) 225 that serve as the gateway between the mobile node 215 and the broader network outside of the ASN 205. Each ASN-GW 225 provides various functional elements that are used to support communication with the mobile node 215. The functional elements may be defined, configured, and/or instantiated on the basis of context information associated with the access terminals 215. In the illustrated embodiment, the functional entities include a paging controller 230, an anchor authenticator 235, and an anchor data path function 240. Although a single one of each of the functional entity 230, 235, 240 are depicted in FIG. 2, persons of ordinary skill in the art having benefit of the present disclosure should appreciate that the ASN-GW 225 typically instantiates these functional entities 230, 235, 240 on a per-user basis and so multiple instantiations may be present on each ASN-GW 225 depending on the number of user equipment that are currently being served by the ASN 225.

The paging controller 230 manages the paging process and the idle state for the associated access terminal 215. The paging controller 230 retains the access terminal state and operational parameters while the access terminal 215 is in idle mode. The paging controller 230 can be identified by an identifier such as a unique 48-bit identifier called the paging controller ID. The access terminal 215 can signal the paging controller ID during network reentry and location update procedures. Context information representative of the paging controller 230 may include the state information, the operational parameters, the paging controller ID, and the like. The paging controller 230 is typically instantiated when the access terminal 215 enters the idle mode and therefore the paging controller 230 is not present or instantiated in the ASN-GW 225 when the access terminal 215 is in the active mode. In alternative embodiments, additional functionality may be implemented in the paging controller 230, e.g., as specified in the WiMAX standards.

The anchor authenticator 235 negotiates the authentication of the subscriber and the device, authorizes network entry, and controls the identity of the subscriber (e.g., at the access terminal 215) entering the network and generates keys that are used for encryption of messages traveling over the air interface 220. The anchor authenticator 235 may also act as a client for an AAA server (not shown in FIG. 2). The anchor authenticator 235 is uniquely identified by an authenticator ID, which may be formed from a routable IPv4 or IPv6 address or from a 48-bit media access control (MAC) address. Context information representative of the anchor authenticator 235 may include a subscriber identity, encryption keys, AAA client information, the authenticator ID, and the like. In alternative embodiments, additional functionality may be implemented in the anchor authenticator 235, e.g., as specified in the WiMAX standards.

The anchor data path function 240 serves as the anchor for data paths to the subscriber (e.g., the access terminal 215). The core serving network may send the downlink packets to the anchor of the data path and the anchor data path function then forwards the downlink packets to the access terminal 215. In idle state, when the anchor data path function 240 receives downlink packets destined for and/or addressed to the idle access terminal 215 from the core network, the anchor data path function 240 first pages the access terminal 215, waits for the access terminal 215 to reenter the network and then delivers the downlink packets to the access terminal 215 through the serving base station 210. The anchor data path function 240 may be uniquely identified by an anchor data path function ID, which may be formed from a routable IPv4 or IPv6 address or from a 48-bit media access control (MAC) address. Context information representative of the anchor data path function 240 may include routing information for the data path, the anchor data path function ID, and the like. In alternative embodiments, additional functionality may be implemented in the anchor data path function 240, e.g., as specified in the WiMAX standards.

In the illustrated embodiment, the access terminal 215 initially has a wireless communication connection with the ASN 205(1) over the air interface 220(1). The access terminals 215 may then change its association from the source ASN 205(1) to the target ASN 205(2) and establish a wireless communication connection with the target ASN 205(2). For example, the access terminal 215 may move from a region served by the ASN 205(1) into a region served by the ASN 205(2). However, the access terminal 215 may also change its association in response to other mobility events such as changing environmental conditions, fading of the air interfaces 220, load-balancing operations, and the like. If the access terminal 215 is in the idle mode, the access terminal 215 may signal, e.g., in a predetermined time slot, the changing association by transmitting a location update message to the target ASN 205(2). Alternatively, if the access terminal 215 is in the active mode, the access terminal may perform handoff to the target ASN 205(2). The handoff may be initiated by the access terminal 215 or the network 200. The functional entities 230, 235, 240 may be moved, transferred, or migrated from the source ASN-GW 225(1) to the target ASN-GW 225(2). For example, the functional entities 230, 235, 240 may be moved by transmitting context information representative of the functional entities 230, 235, 240 from the source ASN-GW 225(1) to the target ASN-GW 225(2).

Figure 3:
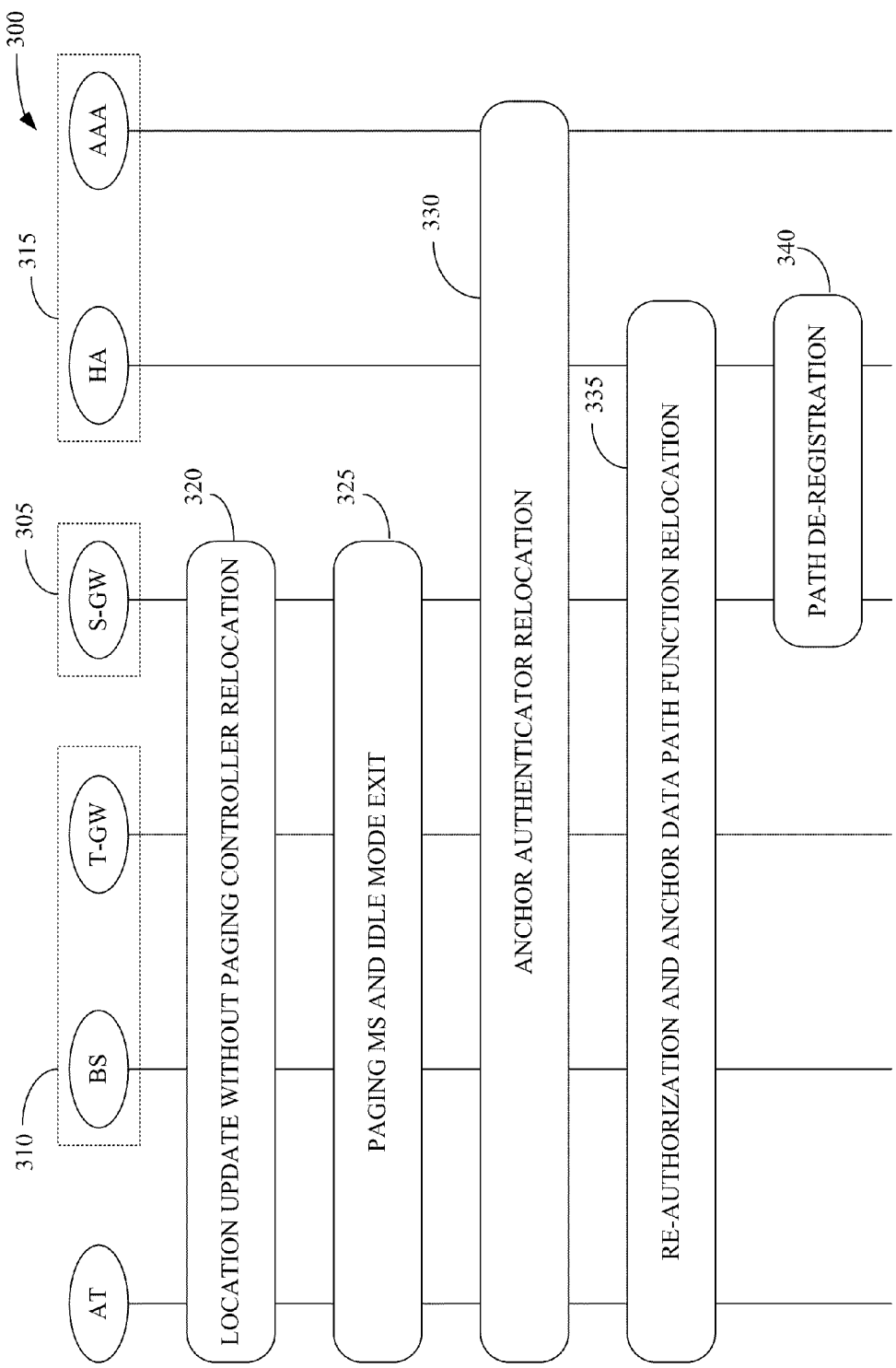
FIG. 3 conceptually illustrates a first exemplary embodiment of a method for relocating functional entities between a source ASN and a target ASN during mobility events in a wireless communication system.

FIG. 3 conceptually illustrates a first exemplary embodiment of a method 300 for relocating functional entities between a source ASN 305 and a target ASN 310 during mobility events in a wireless communication system. In the illustrated embodiment, the source ASN 305 includes a source ASN-GW (S-GW) and the target ASN 310 includes a base station (BS) and a target ASN-GW (T-GW). The wireless communication system also includes a core serving network 315 that supports a home agent (HA) for an access terminal (AT) and an AAA server that includes profile information for the subscriber and the access terminal. In the illustrated embodiment, the elements of the wireless communication system operate according to the WiMAX standards and/or protocols. The access terminal in the illustrated embodiment is initially in the idle mode and changes its association from the source ASN to the target ASN in response to a mobility event. Migration of the functional entities (e.g., the anchor authenticator and the anchor data path function) proceeds in four stages.

During the first stage 320, the idle access terminal and the wireless communication system perform a conventional location update procedure that includes the access terminal sending a range request (RNG-REQ) message to the base station in the target ASN, which then conveys a location update request to the source ASN via the target ASN-GW. The location update request initiates a conventional location update procedure that is processed/negotiated between the base station, the target ASN, and the source ASN. In the illustrated embodiment, the location update procedure is performed without moving the paging controller from the source ASN. Embodiments of the first stage 320 typically require overhead corresponding to the exchange of eight or more messages.

During the second stage 325, the network decides to page the access terminal and the access terminal exits from the idle mode and becomes active so that it can participate in the message exchanges that are used to move the functional entities to the target ASN-GW. The network page originates in the source ASN and is conveyed to the access terminal via the target ASN. If the access terminal responds to the page message, then the access terminal, the source ASN and the target ASN can establish/negotiate a data path through the network. Embodiments of the second stage 325 typically require overhead corresponding to the exchange of 16 or more messages.

During the third stage 330, the active access terminal participates in relocating the anchor authenticator and the anchor data path function from the source ASN to the target ASN. Transmitting the context information for these functional entities typically includes moving the access terminal's security history, security keys, authorization context, mobility contacts, and the like to the target ASN. The access terminal may also be re-authenticated by the AAA server and any necessary updates or changes to the security keys may be performed. Accounting for the connection to the source ASN can be stopped and accounting with the target ASN can begin. Embodiments of the third stage 330 typically require overhead corresponding to the exchange of 18 or more messages.

During the fourth stage 335, migration of the context information is complete and the anchor data path function migrates from the S-GW to the T-GW and de-registers (at 340) the prior date path from the home agent in the core network 315. Embodiments of the fourth stage 335 typically require overhead corresponding to the exchange of 3 or more messages. Consequently, the first exemplary embodiment of the method 300 may require overhead corresponding to the exchange of at least 45 messages.

Figure 4:
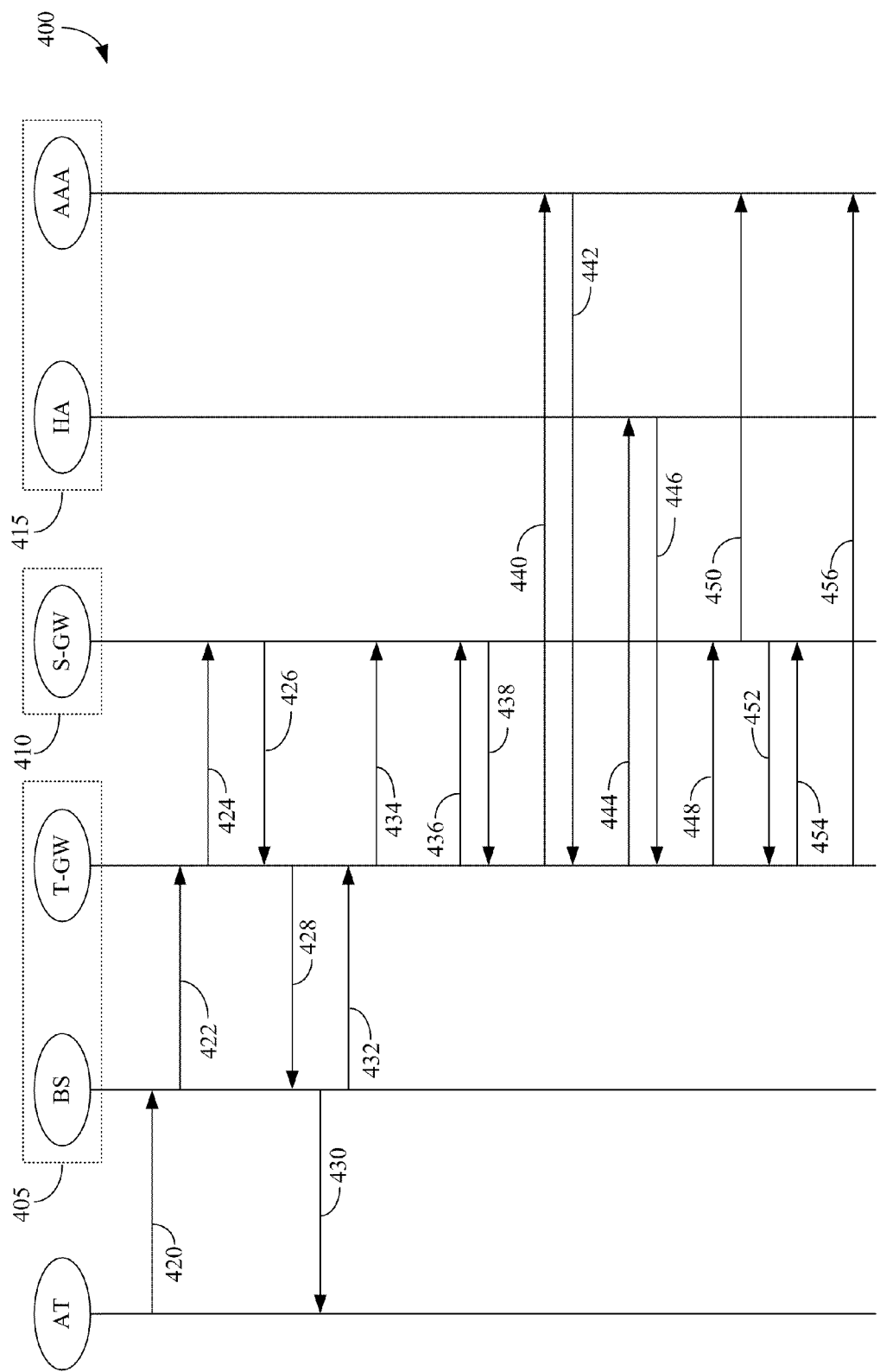
FIG. 4 conceptually illustrates a second exemplary embodiment of a method for relocating functional entities between a source ASN and a target ASN during mobility events in a wireless communication system.

FIG. 4 conceptually illustrates a second exemplary embodiment of a method 400 for relocating functional entities between a source ASN 410 and a target ASN 405 during mobility events in a wireless communication system. In the illustrated embodiment, the source ASN 410 includes a source ASN-GW (S-GW) and the target ASN 405 includes a base station (BS) and a target ASN-GW (T-GW). The wireless communication system also includes a core serving network 415 that supports a home agent (HA) for a access terminal (AT) and an AAA server that includes profile information for the access terminal. In the illustrated embodiment, the elements of the wireless communication system operate according to the WiMAX standards and/or protocols. The access terminal in the illustrated embodiment is initially in the idle mode and changes its association from the source ASN to the target ASN in response to a mobility event.

In the illustrated embodiment, the access terminal initiates the location update procedure by sending (at 420) a message such as a RNG-REQ message to request location update. The base station (BS) forwards (at 422) a location update request to the target ASN. The location update request may include information such as paging information, the base station identifier, the paging controller identifier, and the like. The target ASN conveys (at 424) the location update message over an interface to the source ASN. The location update message also includes information requesting the combined relocation procedure so that the paging controller can be relocated as part of a location update procedure and the anchor authenticator and anchor data path functions can be relocated together in a single message flow. The source ASN may determine whether the location update request is valid and whether it supports the combined relocation procedure. If so, the source ASN responds (at 426) by returning a location update response to the target ASN. In the illustrated embodiment, the location update response includes context information for the paging controller that may include a access terminal identifier, a security context, a new paging controller identifier, the old paging controller identifier, paging information, and the like. The location update response may also include information indicating whether the source ASN supports combined relocation so that the target ASN can be notified in the event that combined relocation is not supported.

The target ASN can use the context information to configure or instantiate a paging controller for the access terminal. Since the context information representative of a paging controller is now available at the target ASN, the access terminal can be located in the event that an error or failure occurs in the remainder of the relocation process. In the illustrated embodiment, the target ASN-GW provides (at 428) a location update response to the base station. The provided response may include context information such as the access terminal identifier, the security context, the new paging controller identifier, the old paging controller identifier, paging information, and the like. A confirmation message such as a RNG-RSP can be transmitted (at 430) to the access terminal over the air interface and another location update confirmation can be returned (at 432) to the target ASN-GW. The target ASN can then transmit (at 434) a location update confirmation to the source ASN. In the illustrated embodiment, the location update confirmations include a counter value such as a CMAC_Key_Count (CKC) that may be used for message validation according to the relevant standards.

In the illustrated embodiment, the combined relocation of the anchor authenticator and the anchor data path function is performed after the paging controller has been relocated to the target ASN. The combined relocation may begin with the target ASN transmitting (at 436) a relocation notification message to the source ASN. In one embodiment, the relocation notification message includes information indicating the reason for the relocation (e.g., a location update or handoff), a CPI bit (a charging attribute), paging information, the new paging controller ID, an identifier of the new anchor authenticator, a Paging Controller relocation destination, a base station identifier, a CKC, and the like. The source ASN decides whether to accept or reject the requested combined relocation and then provides (at 438) a relocation notification response to the target ASN. Embodiments of the relocation notification response may include an indication of whether the request was accepted or rejected, a security history of the access terminal, an authorization context for the access terminal, the mobility anchor context for the access terminal, base station information, paging information, a present authenticator verification code (PA_VC), a nonce (PA_NONCE) derived from a current counter value (CMAC_Key_Count) and used for validation, a random value nonce (NA_NONCE) used in the calculation of the new authenticator validation code, a security context, and the like.

For AAA authorization, the target ASN sends (at 440) an access request for the relocated authenticator session to the AAA server. In one embodiment, the access request is a RADIUS access request or a Diameter WiMAX Diameter Extended Authentication Protocol (EAP) Request (WDER) that includes the new anchor authenticator identifier, the PA_VC, the PA_NONCE, and a network access identifier (NAI) for the access terminal. The AAA server can decide whether to accept the request and then it may send a response (at 442) such as a RADIUS Access-Accept for a Diameter WiMAX Diameter EAP Accept (WDEA) that includes key material such as a master session key generated by the AAA server. The anchor data path function in the target ASN also registers (at 444) with the access terminal's home agent, which sends (at 446) a registration reply to verify the registration. At this point in the process, the combined relocation of the anchor authenticator and the anchor data path function has been performed and the target ASN sends (at 448) a relocation complete request to the source ASN. Exemplary relocation completion requests include information indicating the authentication results, the new authentication verification code (NA_VC), and an indication of the anchor data path function relocation to the target ASN. Upon receipt of the relocation completion requests, the source ASN sends (at 450) an accounting stop message to the AAA server, indicating it is no longer the serving anchor authenticator and data path function for the access terminal, and sends (at 452) a relocation complete response to the target ASN. Exemplary relocation complete responses include the accounting context for the access terminal, a Pre-Paid Accounting Client (PPAC), and the like. The target ASN can then send (at 454) a relocation complete acknowledgment to the source ASN and may also send (at 456) an accounting start message to the AAA server. The accounting start message indicates that the new anchor authenticator and anchor data path function are the new serving anchor authenticator and anchor data path function for the access terminal, respectively.

Figure 5:
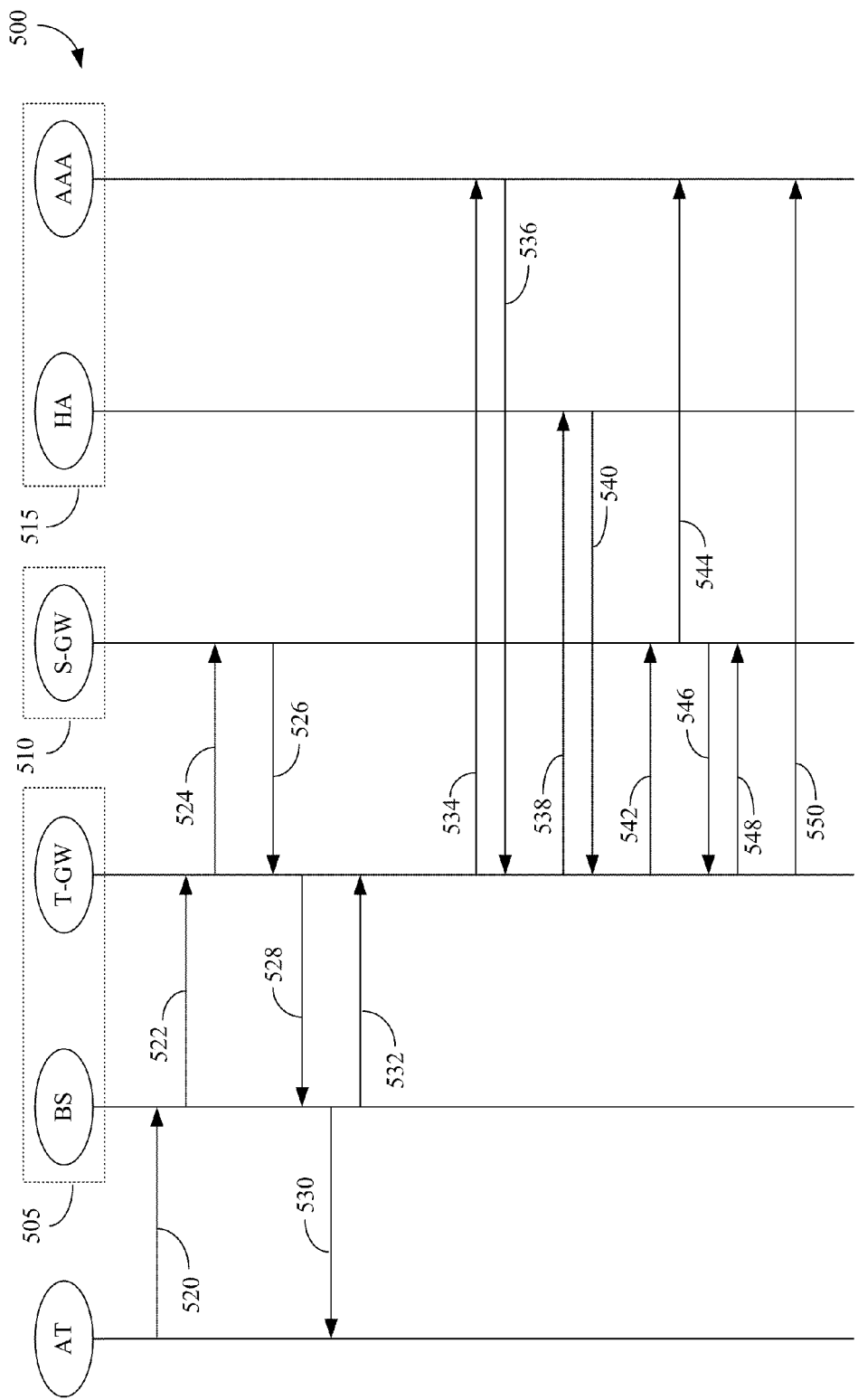
FIG. 5 conceptually illustrates a third exemplary embodiment of a method for relocating functional entities between a source ASN and a target ASN during mobility events in a wireless communication system.

FIG. 5 conceptually illustrates a third exemplary embodiment of a method 500 for relocating functional entities between a source ASN 510 and a target ASN 505 during mobility events in a wireless communication system. In the illustrated embodiment, the source ASN 510 includes a source ASN-GW (S-GW) and the target ASN 505 includes a base station (BS) and a target ASN-GW (T-GW). The wireless communication system also includes a core serving network 515 that supports a home agent (HA) for an access terminal (AT) and an AAA server that includes profile information for the access terminal. In the illustrated embodiment, the elements of the wireless communication system operate according to the WiMAX standards and/or protocols. The access terminal in the illustrated embodiment is initially in the idle mode and changes its association from the source ASN to the target ASN in response to a mobility event.

The third exemplary embodiment of the method 500 differs from the second exemplary embodiments depicted in FIG. 4 by performing a combined relocation of the paging controller, the anchor authenticator, and the anchor data path function in response to a location update sent by the access terminal. In the illustrated embodiment, the access terminal initiates the location update procedure by sending (at 520) a message such as a RNG-REQ message to request location update. The base station (BS) forwards (at 522) a location update request to the target ASN. The location update request may include information such as paging information, the base station identifier, the paging controller identifier, and the like. The target ASN conveys (at 524) a relocation notification message over an interface to the source ASN. The relocation notification message also includes information requesting the combined relocation procedure so that the paging controller, the anchor authenticator, and the anchor data path function can be relocated as part of the location update procedure. In one embodiment, the relocation notification message includes information indicating the reason for the relocation (e.g., a location update or handoff), a CPI bit, paging information, the new paging controller ID, an identifier of the new anchor authenticator, an anchor paging controller (APC) relocation destination, a base station identifier, a CMAC_Key_Count, and the like.

The source ASN decides whether to accept or reject the requested combined relocation. In one embodiment, the source ASN may determine whether the location update request is valid and whether it supports the combined relocation procedure. If so, the source ASN responds (at 526) by providing a relocation notification response to the target ASN that indicates that the request has been accepted. Embodiments of the relocation notification response may include context information that indicates whether the request was accepted or rejected, a security history of the access terminal, an authorization context for the access terminal, the mobility anchor context for the access terminal, base station information, paging information, a present authenticator verification code (PA_VC), a nonce (PA_NONCE) derived from a current counter value (CMAC_Key_Count) and used for validation, a random value nonce, a security context, a new paging controller identifier, the old paging controller identifier, paging information, and the like.

The target ASN can use the context information to configure or instantiate a paging controller, an anchor authenticator, and/or an anchor data path function for the access terminal. Since the context information representative of the paging controller is now available at the target ASN, the access terminal can be located by the network in the event that an error or failure occurs in the remainder of the relocation process. In the illustrated embodiment, the target ASN-GW provides (at 528) a location update response to the base station. The provided response may include context information such as the access terminal identifier, the security context, the new paging controller identifier, the old paging controller identifier, paging information, and the like. A location update confirmation message such as a RNG-RSP can be transmitted (at 530) to the access terminal over the air interface and another location update confirmation can be returned (at 532) to the target ASN-GW.

For AAA authorization, the target ASN sends (at 534) an access request for the relocated authenticator session to the AAA server. In one embodiment, the access request is a RADIUS access request or a Diameter WiMAX Diameter Extended Authentication Protocol (EAP) Request (WDER)

that includes the new anchor authenticator identifier, the PA_VC, the PA_NONCE, and a network access identifier for the access terminal. The AAA server can decide whether to accept the request and then it may send a response (at 536) such as a RADIUS Access-Accept for a Diameter WiMAX Diameter EAP Accept (WDEA) that includes key material such as a master session key generated by the AAA server. The anchor data path function at the target ASN may also register (at 538) with the access terminal's home agent, which sends (at 540) a registration reply to verify the registration. At this point in the process, the combined relocation of the anchor authenticator, paging controller and the anchor data path function has been performed and the target ASN sends (at 542) a relocation complete request to the source ASN. Exemplary relocation completion requests include information indicating the authentication results, the NA_VC, and an indication of the anchor data path function relocation to the target ASN. Upon receipt of the relocation completion requests, the source ASN sends (at 544) an accounting stop message to the AAA server and sends (at 546) a relocation complete response to the target ASN. Exemplary relocation complete responses include the accounting context for the access terminal, a pre-paid accounting client (PPAC), and the like. The target ASN can then send (at 548) a relocation complete acknowledgment to the source ASN and may also send (at 550) an accounting start message to the AAA server. The accounting start message indicates that the new anchor authenticator and anchor data path function are the serving anchor authenticator and the anchor data path function for the access terminal.

Figure 6:
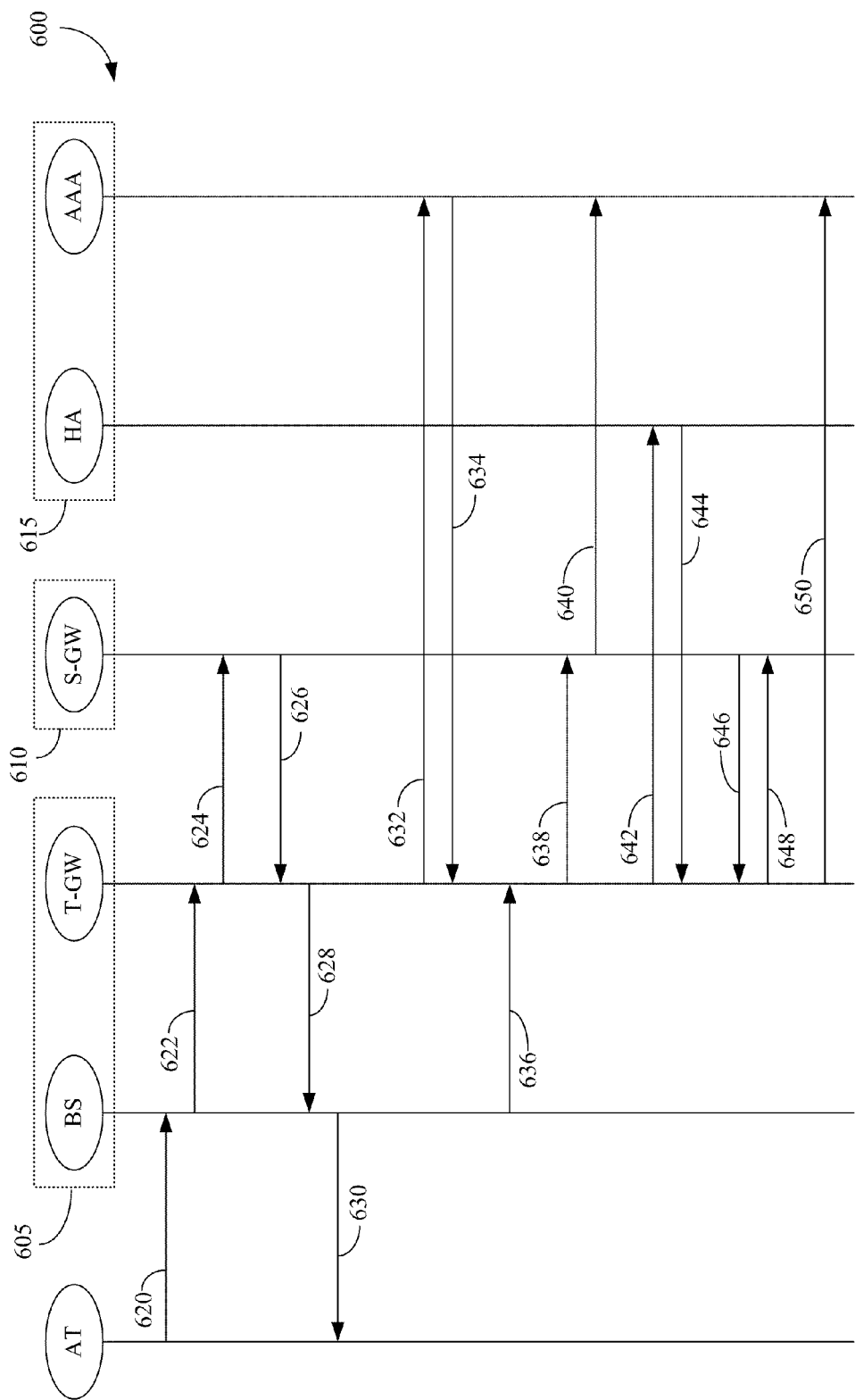
FIG. 6 conceptually illustrates a fourth exemplary embodiment of a method for relocating functional entities between a source ASN and a target ASN during mobility events in a wireless communication system.

FIG. 6 conceptually illustrates a fourth exemplary embodiment of a method 600 for relocating functional entities between a source ASN 610 and a target ASN 605 during mobility events in a wireless communication system. In the illustrated embodiment, the source ASN 610 includes a source ASN-GW (S-GW) and the target ASN 605 includes a base station (BS) and a target ASN-GW (T-GW). The wireless communication system also includes a core serving network 615 that supports a home agent (HA) for an access terminal (AT) and an AAA server that includes profile information for the access terminal. In the illustrated embodiment, the elements of the wireless communication system operate according to the WiMAX standards and/or protocols. The access terminal in the illustrated embodiment is initially in the idle mode and changes its association from the source ASN to the target ASN in response to a mobility event. The fourth exemplary embodiment of the method 600 implements combined relocation of the paging controller, the anchor authenticator, and the anchor data path function in response to a location update sent by the access terminal using a different sequence of messages than the third exemplary embodiment depicted in FIG. 5.

In the fourth exemplary embodiment, the access terminal initiates the location update procedure by sending (at 620) a message such as a RNG-REQ message to request location update. The base station (BS) forwards (at 622) a location update request to the target ASN. The location update request may include information such as paging information, the base station identifier, the paging controller identifier, and the like. The target ASN conveys (at 624) a relocation notification message to the source ASN 610. The message includes information requesting the combined relocation procedure so that the paging controller, the anchor authenticator, and the anchor data path function can be relocated as part of the location update procedure. In one embodiment, the relocation notification message includes information indicating the reason for the relocation (e.g., a location update or handoff), a CPI bit indicating a charging attribute, paging information, the new paging controller ID, an identifier of the new anchor authenticator, a paging controller relocation destination, a base station identifier, a CMAC_Key_Count, and the like.

The source ASN decides whether to accept or reject the requested combined relocation. In one embodiment, the source ASN may determine whether the location update request is valid and whether it supports the combined relocation procedure. If so, the source ASN responds (at 626) providing a relocation notification response to the target ASN that indicates that the request has been accepted. Embodiments of the relocation notification response may include context information that indicates whether the request was accepted or rejected, a security history of the access terminal, an authorization context for the access terminal, the mobility anchor context for the access terminal, base station information, paging information, a present authenticator verification code (PA_VC), a nonce (PA_NONCE) derived from a current counter value (CMAC_Key_Count), a random value nonce (NA_NONCE), a security context, a new paging controller identifier, the old paging controller identifier, paging information, and the like.

The target ASN can use the context information to configure or instantiate a paging controller, an anchor authenticator, and/or an anchor data path function for the access terminal. Since the context information representative of the paging controller is now available at the target ASN, the access terminal can be located by the network in the event that an error or failure occurs in the remainder of the relocation process. In the illustrated embodiment, the target ASN-GW provides (at 628) a location update response to the base station. The provided response may include context information such as the access terminal identifier, the security context, the new paging controller identifier, the old paging controller identifier, paging information, and the like. A Location Update confirmation message such as a RNG-RSP can be transmitted (at 630) to the access terminal over the air interface.

For AAA authorization, the target ASN sends (at 632) an access request for the relocated authenticator session to the AAA server. In one embodiment, the access request is a RADIUS access request or a Diameter WiMAX Diameter Extended Authentication Protocol (EAP) Request (WDER) that includes the new anchor authenticator identifier, the PA_VC, the PA_NONCE, and a network access identifier for the access terminal. The AAA server can decide whether to accept the request and then it may send a response (at 634) such as a RADIUS Access-Accept or a Diameter WiMAX Diameter EAP Accept (WDEA) that includes key material such as a master session key generated by the AAA server. Concurrently with the messages exchanged between the T-ASN 605 and the core serving network 615, the BS at the T-ASN sends (at 636) a location update confirmation (including the CMAC_Key_Count) to the target ASN-GW. The target gateway transmits (at 638) a relocation complete request message to the source gateway (the present Authenticator) to complete the combined relocation. The relocation complete request message may include an NA_VC generated by the new Authenticator. The Authenticator in the source gateway sends (at 640) an accounting stop message to the AAA server to make the AAA server aware that the Authenticator in the source gateway is no longer serving the access terminal.

The anchor data path function in the target ASN registers (at 642) with the access terminal's home agent, which sends (at 644) a registration reply to verify the registration. At this point in the process, the combined relocation of the anchor authenticator, paging controller, and the anchor data path function has been performed and the target ASN sends (at 648) a relocation complete request to the source ASN. Exemplary relocation completion requests include information indicating the authentication results, the NA_VC, and an indication of the anchor data path relocation to the target ASN. Upon receipt of the relocation completion requests, the source ASN sends (at 640) an accounting stop message to the AAA server and sends (at 646) a relocation complete response to the target ASN. Exemplary relocation complete responses include the accounting context for the access terminal, a PPAC, and the like. The target ASN can then send (at 648) a relocation complete acknowledgment to the source ASN and may also send (at 650) an accounting start message to the AAA server. The accounting start message indicates that the new anchor authenticator is the serving anchor authenticator for the access terminal.

Combined relocation of multiple functional entities can also be used during handoff of an active mobile unit between different ASN. For example, both the Anchor Data Path Function and the Anchor Authenticator could be relocated to the new ASN-GW when a mobile unit performs an inter ASN handoff. In one embodiment, a two-stage process can be used to relocate the context information to reduce or avoid service disruption of the active calls. First, the Anchor Data Path Function and Anchor Authenticator Function may be relocated together to new target ASN-GW using a message such as an Anchor_DPF_HO_Req message that is sent from the serving ASN-GW to the target ASN-GW. One embodiment of the message contains an optimized relocation type value to indicate a request for a combined relocation of both functions. The message sent from the serving ASN-GW can include context information (which may be referred to as an Anchor MM Context) for defining/configuring the Anchor Data Path Function and Authenticator Function contexts pertaining to the mobile unit. At the second stage, following completion of the combined relocation of the Anchor Authenticator and Anchor Data Path Functions to the new target ASN-GW, the Authentication, Authorization and Accounting (AAA) server is informed about the new Authenticator function that has been relocated to the new target ASN-GW. The AAA server verifies the relocation by verifying one or more keys presented to the AAA server by the new Authenticator. Once the Authenticator relocation is completed, a binding between the anchor data path function and the HA is updated.

Figure 7:
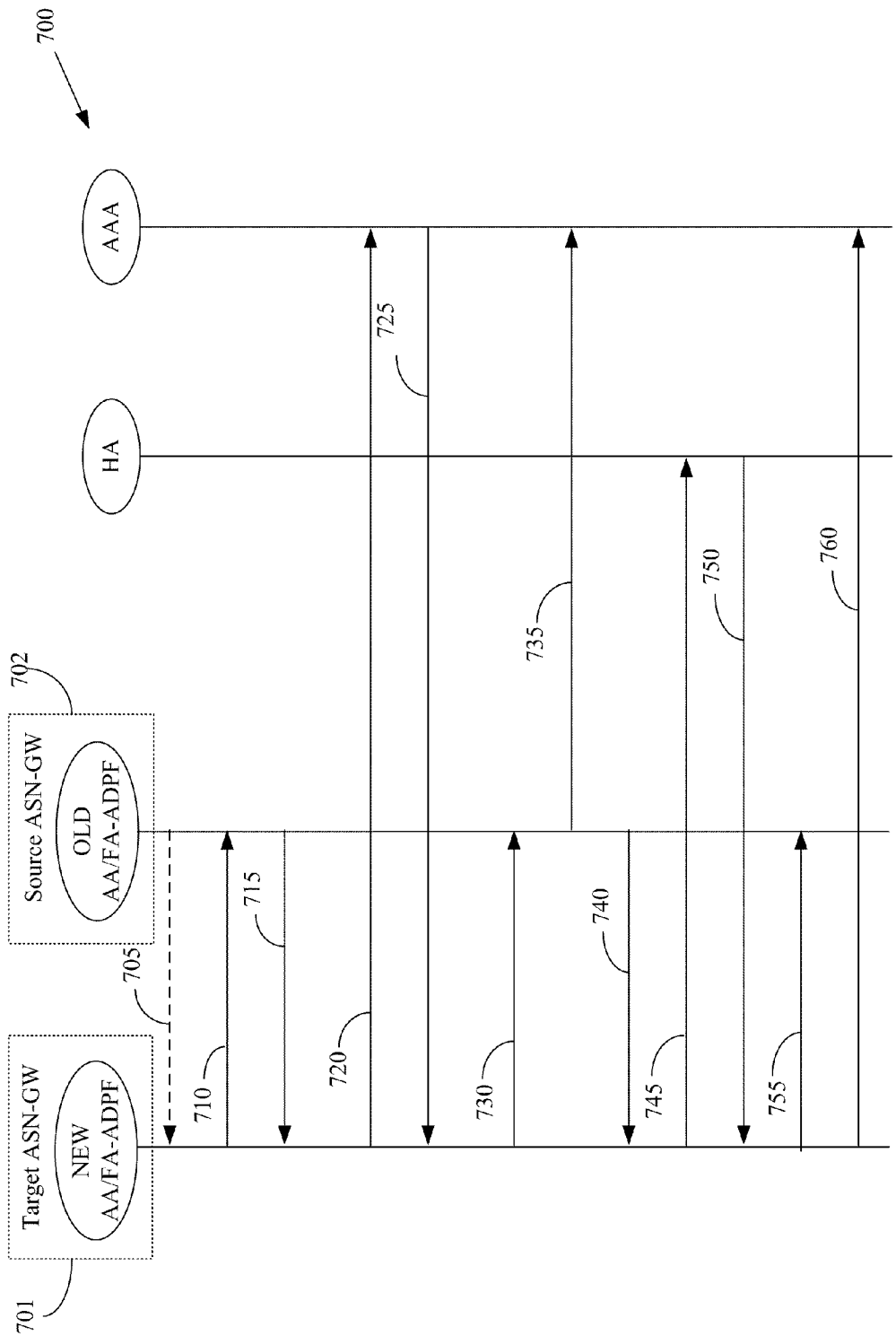
FIG. 7 conceptually illustrates one exemplary embodiment of a method for active mode combined relocation of ASN functional entities that supports relocation of an authenticator and an anchor data path function in the PULL mode by a target ASN or in the PUSH mode by a source ASN.

FIG. 7 conceptually illustrates one exemplary embodiment of a method 700 for active mode combined relocation of ASN functional entities when an active access terminal hands off between a source (old) ASN-GW and a target (new) ASN-GW. In the illustrated embodiment, each ASN-GW supports functional entities including and Anchor Authenticator (AA), a foreign agent (FA), and an Anchor Data Path Function (ADPF). The illustrated embodiment supports either a PUSH mechanism that can be initiated by the serving (old) ASN-GW or a PULL mechanism that can be initiated by the target (new) ASN-GW. The method therefore includes an optional relocation initiation message that can be sent (at 705) from the old ASN-GW to the new ASN-GW.

In the illustrated embodiment, the target (new) ASN-GW 701 requests (at 710) combined relocation of the anchor data path function and the anchor authenticator by sending (at 710) a Relocation Notify message to the old ASN-GW 702. For the PUSH case, the message is sent (at 710) in response to the optional relocation initiation message (at 705) from the serving (old) ASN-GW. For the PULL case, the message is sent (at 710) to initiate the PULL mechanism. The message includes the optimized combined relocation (OCR) cause, a new Authenticator ID, and potentially other information. If the source (old) ASN-GW validates the parameters sent by the target ASN-GW, it responds to the target ASN-GW by sending (at 715) a message such as a Relocation_Notify_Rsp to the target ASN-GW. If the request is accepted, the Relocation_Notify_Rsp message contains the security information of the access terminal to the new authenticator function. Exemplary security information may include a security history of the access terminal, and authorization context, and anchor MM context, various nonces, base station information (BS Info), CMAC_KEY_Count, and the like. The new authenticator function sends (at 720) a message such as a Radius Access Request message to the AAA server to update the AAA server about the new authenticator and the various key parameters that the new authenticator received from the old Authenticator. If the AAA server agrees to relocate and validates the key parameters provided by the new authenticator, the AAA server sends (at 725) back a message such as a Radius Access-Accept message.

At this point in the process, the target ASN sends (at 730) a relocation complete request to the source ASN. Exemplary relocation completion requests include information indicating the authentication results, the NA_VC, and a request for anchor data path relocation to the new target ASN. Upon receipt of the relocation completion requests, the source ASN sends (at 735) an accounting stop message to the AAA server to make the AAA server aware that the source ASN is no longer serving the access terminal. The source ASN also sends (at 740) a relocation complete response to the target ASN. Exemplary relocation complete responses include the accounting context for the access terminal, a PPAC, and the like. In various alternative embodiments, the accounting stopped message and the relocation response can be sent (at 735, 740) concurrently or in any desirable order.

The anchor data path function and foreign agent (FA) in the target (new) ASN registers (at 745) with the access terminal's home agent in the core serving network. A new binding with the home agent is performed and then the home agent sends (at 750) a registration reply to verify the registration. At this point in the process, the combined relocation of the anchor authenticator and the anchor data path function has been performed and the target ASN sends (at 755) a relocation complete acknowledgment to the source (old) ASN and may also send (at 760) an accounting start message to the AAA server. The accounting start message indicates that the new anchor authenticator is the serving anchor authenticator for the access terminal.

Embodiments of the combined relocation procedures described herein have a number of advantages over conventional techniques that independently and/or separately relocate functional entities between the ASNs. For example, independently relocating the paging controller, anchor authenticator, and anchor data path function requires waking up the access terminal so that it exits the idle mode to participate in the relocation process. This approach has significantly higher overhead and requires at least 45 messages to complete relocation of the three functional entities. In contrast, the combined relocation procedures described herein may be able to relocate the paging controller, anchor authenticator, and anchor data path function using as few as 16 messages. Combining the relocation procedures therefore significantly reduces the overhead required by the relocation process. Furthermore, reducing the number of messages may reduce the likelihood that the relocation process fails or is interrupted due to lost or corrupted messages. Embodiments of the techniques described herein may also provide early paging information to the target ASN during the location update procedure, which may allow the network to maintain contact with the access terminal in the event that the relocation process fails or is interrupted.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   receiving, at a target access service network gateway (ASN-GW), a location update request for an access terminal in an idle mode;
   transmitting, from the target ASN-GW to a source ASN-GW, a relocation notification message to request combined relocation of at least two functional entities associated with the access terminal, wherein said at least two functional entities comprise a paging controller and at least one of an access authenticator and an anchor data path function;
   receiving, at the target ASN-GW from the source ASN-GW, a relocation notification response message including context information for said at least two functional entities; and
   relocating the at least two functional entities to the target ASN-GW using the context information included in the relocation notification response message.

2. The method of claim 1, wherein receiving the relocation notification response message comprises receiving a relocation notification response message including context information representative of the paging controller and the access authenticator for the access terminal.

3. A method, comprising:
   receiving, at a source access service network gateway (ASN-GW) from a target ASN-GW, a relocation notification message to request combined relocation of at least two functional entities associated with an access terminal upon receipt of a location update request for said access terminal in an idle mode;
   transmitting a relocation notification response message including context information from the source ASN-GW to the target ASN-GW, wherein the relocation notification response message includes context information representative of the at least two functional entities associated with the access terminal, and wherein the at least two functional entities comprise a paging controller and at least one of an access authenticator and an anchor data path function; and
   relocating the at least two functional entities from the source ASN-GW to the target ASN-GW based on the context information included in the relocation notification response message.

4. The method of claim 3, wherein transmitting the relocation notification response message comprises transmitting the relocation notification response message including context information representative of the paging controller and the anchor authenticator for the access terminal.

5. The method of claim 3, wherein transmitting the relocation notification response message comprises transmitting the relocation notification response message in response to the source ASN-GW determining that the relocation notification message indicates a valid location update and determining that the source ASN-GW supports the requested combined relocation.

6. The method of claim 3, wherein the request for combined relocation is denied in response to the source ASN-GW determining that the relocation notification message does not indicate a valid location update or determining that the source ASN-GW does not support the requested combined relocation.

7. An access service network gateway (ASN-GW), configured to:
   receive, at the ASN-GW while operating as a target ASN-GW, a location update request for an access terminal in an idle mode;

transmit, from the target ASN-GW to an ASN-GW while operating as a source ASN-GW, a relocation notification message to request combined relocation of at least two functional entities associated with the access terminal, wherein said at least two functional entities comprise a paging controller and at least one of an access authenticator and an anchor data path function;

receive, at the target ASN-GW from the source ASN-GW, a relocation notification response message including context information for said at least two functional entities; and relocate the at least two functional entities to the target ASN-GW using the context information included in the relocation notification response message.

8. The ASN-GW of claim 7, wherein receiving the relocation notification response message comprises receiving a relocation notification response message including context information representative of the paging controller and the access authenticator for the access terminal.

9. An access service network gateway (ASN-GW), configured to:

receive, at the ASN-GW while operating as a source ASN-GW from a target ASN-GW, a relocation notification message to request combined relocation of at least two functional entities associated with an access terminal upon location update request for said access terminal in an idle mode;

transmit a relocation notification response message including context information from the source ASN-GW to the target ASN-GW, wherein the relocation notification response message includes context information representative of the at least two functional entities associated with the access terminal, and wherein the at least two functional entities comprise a paging controller and at least one of an access authenticator and an anchor data path function; and relocate the at least two functional entities from the source ASN-GW to the target ASN-GW based on the context information included in the relocation notification response message.

10. The ASN-GW of claim 9, wherein transmitting the relocation notification response message comprises transmitting the relocation notification response message including context information representative of the paging controller and the anchor authenticator for the access terminal.

11. The ASN-GW of claim 9, wherein transmitting the relocation notification response message comprises transmitting the relocation notification response message in response to the source ASN-GW determining that the relocation notification message indicates a valid location update and determining that the source ASN-GW supports the requested combined relocation.

12. The ASN-GW of claim 9, wherein the request for combined relocation is denied in response to the source ASN-GW determining that the relocation notification message does not indicate a valid location update or determining that the source ASN-GW does not support the requested combined relocation.

* * * * *